(12) United States Patent
Bai et al.

(10) Patent No.: US 12,066,604 B2
(45) Date of Patent: Aug. 20, 2024

(54) 4K HIGH-RESOLUTION PANORAMIC ANNULAR OPTICAL SYSTEM

(71) Applicant: ZHEJIANG UNIVERSITY, Zhejiang (CN)

(72) Inventors: Jian Bai, Zhejiang (CN); Jia Wang, Zhejiang (CN); Xiao Huang, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 831 days.

(21) Appl. No.: 17/261,722

(22) PCT Filed: Jun. 5, 2020

(86) PCT No.: PCT/CN2020/094584
§ 371 (c)(1),
(2) Date: Jan. 20, 2021

(87) PCT Pub. No.: WO2021/036393
PCT Pub. Date: Mar. 4, 2021

(65) Prior Publication Data
US 2021/0271059 A1    Sep. 2, 2021

(30) Foreign Application Priority Data

Aug. 28, 2019  (CN) .......................... 201910802850.6

(51) Int. Cl.
*G02B 13/06* (2006.01)
*G02B 9/64* (2006.01)
(52) U.S. Cl.
CPC .............. *G02B 13/06* (2013.01); *G02B 9/64* (2013.01)
(58) Field of Classification Search
CPC ...... G02B 13/06; G02B 9/64; G02B 13/0015; G02B 13/006; G02B 13/08; G02B 17/00;
(Continued)

(56) References Cited

U.S. PATENT DOCUMENTS

| 2008/0247062 A1* | 10/2008 | Mizusawa | G02B 13/06 359/736 |
| 2013/0057971 A1* | 3/2013 | Zhao | G02B 13/06 359/731 |
| 2019/0154885 A1 | 5/2019 | Steever et al. | |

FOREIGN PATENT DOCUMENTS

| CN | 101038366 A | 9/2007 |
| CN | 103969800 A | 8/2014 |

(Continued)

OTHER PUBLICATIONS

English translation of KR-101439411-B1, (2014) (Year: 2014).*
(Continued)

*Primary Examiner* — Thomas K Pham
*Assistant Examiner* — Kuei-Jen L Edenfield
(74) *Attorney, Agent, or Firm* — Tutunjian & Bitetto, P.C.

(57) ABSTRACT

A 4K high-resolution panoramic annular optical system includes a panoramic annular lens head unit, a subsequent lens group, and a 4K sensor (SE) that is coaxially installed. The panoramic annular lens head unit includes a first lens (PALIPAL1) and a second lens (PAL2). The subsequent lens group includes a third lens (RL1), a fourth lens (RL2), a fifth lens (RL3), a sixth lens (RL4), a seventh lens (RL5), an eighth lens (RL6), and a ninth lens (RL7) that are arranged in order from an object plane to an image plane. The first lens (PAL1) and the fifth lens (RL3) are meniscus glass lenses with positive refractive power. The six lens (RL4) and the ninth lens (RL7) are meniscus glass lenses with negative refractive power, and the second lens (PAL2), the fourth lens (RL2), the seventh lens (RL5), and the eighth lens (RL6) are biconvex lenses with positive refractive power.

2 Claims, 6 Drawing Sheets

(58) Field of Classification Search
CPC ........ G02B 17/02; G02B 17/06; G02B 17/08; G02B 13/00
USPC ................................ 359/749, 680, 691, 725
See application file for complete search history.

(56) References Cited

FOREIGN PATENT DOCUMENTS

| | | | |
|---|---|---|---|
| CN | 104181675 A | | 12/2014 |
| CN | 105445914 A | | 3/2016 |
| CN | 106610520 A | * | 5/2017 |
| CN | 106610520 A | | 5/2017 |
| CN | 109709661 A | | 5/2019 |
| CN | 110568584 A | | 12/2019 |
| KR | 101439411 B1 | * | 9/2014 |
| WO | WO-2017107910 A1 | * | 6/2017 |

OTHER PUBLICATIONS

English translation of CN-106610520-A, (2017) (Year: 2017).*
English translation ofWO-2017107910-A1, (201) (Year: 2017).*
International Search Report from PCT/CN2020/094584 dated Sep. 4, 2020, 5 pgs.

* cited by examiner

Object plane: 50.00 (º)

Object plane: 70.00 (º)

4K HIGH-RESOLUTION PANORAMIC ANNULAR OPTICAL SYSTEM

The present application claims priority to the Chinese Patent Application No. 201910802850.6, filed with the China National Intellectual Property Administration (CNIPA) on Aug. 28, 2019, and entitled "4K HIGH-RESOLUTION PANORAMIC ANNULAR OPTICAL SYSTEM", which is incorporated herein by reference in its entirety.

TECHNICAL FIELD

The present disclosure relates to the field of automated driving, and in particular, to a 4K high-resolution panoramic annular optical system.

BACKGROUND

A panoramic annular imaging system needs to geometrically transform and image the objects in a super-large field of view onto an image sensor with a limited image plane at one time. As a result, the objects in the field of view can be allocated with only a few pixels, the resolution of the collected images is usually low, and images of local details cannot be obtained.

With the advent of the 5G era, the speed of information processing has become faster, and people have increasingly high requirements for image quality and clarity. If wide field-of-view imaging is implemented within a limited image plane, images will have a low resolution and poor local details. Therefore, a lens with a large field of view needs to be used with a high-resolution sensor to achieve a large field of view and a high resolution at the same time. In the past, the resolution of image sensors was low, and researchers often used a post-image stitching method or an image processing method to achieve a large field of view and high resolution. Nowadays, rapid development of the image sensor technology makes it possible to directly obtain high-resolution and clear images by using the matched lens and sensor.

SUMMARY

In view of the deficiencies of the prior art, the present disclosure provides a 4K high-resolution panoramic annular optical system, which can meet the requirements of a panoramic annular optical system for a large field of view and a high resolution without post-image stitching or image processing.

The objectives of the present disclosure are achieved by the following technical solutions.

A 4K high-resolution panoramic annular optical system includes a panoramic annular lens head unit, a subsequent lens group, and a 4K sensor SE that are coaxially installed, where the panoramic annular lens head unit includes a first lens PAL1 and a second lens PAL2; the subsequent lens group includes a third lens RL1, a fourth lens RL2, a fifth lens RL3, a sixth lens RL4, a seventh lens RL5, an eighth lens RL6, and a ninth lens RL7 that are arranged in order from an object plane to an image plane; the first lens PAL1 and the fifth lens RL3 are meniscus glass lenses with positive refractive power; the six lens RL4 and the ninth lens RL7 are meniscus glass lenses with negative refractive power; the second lens PAL2, the fourth lens RL2, the seventh lens RL5, and the eighth lens RL6 are biconvex lenses with positive refractive power; the third lens RL1 is a biconcave lens with negative refractive power; convex surfaces of the first lens PAL1, the fifth lens RL3, and the sixth lens RL4 are all facing towards the object plane, and concave surfaces of the first lens PAL1, the fifth lens RL3, and the sixth lens RL4 are all facing towards the image plane; a concave surface of the ninth lens RL7 is facing towards the object plane, and a convex surface of the ninth lens RL7 are facing towards the image plane;

the first lens PAL1 and the second lens PAL2 are glued together to form a first integral unit; an integral front surface of the first integral unit includes a front transmission surface A1 and a front reflection surface A6 located in the center of the front transmission surface, an integral rear surface of the first integral unit includes a rear reflection surface A3 and a rear transmission surface A8 located in the center of the rear reflection surface, and a glued surface of the first integral unit is a transmission surface A2; the third lens RL1 and the fourth lens RL2 are glued together to form a second integral unit; a front surface of the second integral unit is a transmission surface B1, a rear surface of the second integral unit is a transmission surface B3, and an in-between glued surface of the second integral unit is a transmission surface B2; the fifth lens RL3 is a single lens, a front surface of the fifth lens RL3 is a transmission surface C1, and a rear surface of the fifth lens RL3 is a transmission surface C2; the sixth lens RL4 is a single lens, a front surface of the sixth lens RL4 is a transmission surface D1, and a rear surface of the sixth lens RL4 is a transmission surface D2; the seventh lens RL5 is a single lens, a front surface of the seventh lens RL5 is a transmission surface E1, and a rear surface of the seventh lens RL5 is a transmission surface E2; the eighth lens RL6 and the ninth lens RL7 are glued together to form a third integral unit; a front surface of the third integral unit is a transmission surface F1, a rear surface of the third integral unit is a transmission surface F3, and an in-between glued surface of the third integral unit is a transmission surface F2; a front part of the 4K sensor SE is a protective glass, a front surface of the 4K sensor SE is a light receiving surface G1, and a rear surface of the 4K sensor SE is an image surface G2; the front transmission surface A1 is an annular transmission surface; the reflection surface A3 is an annular reflection surface; the front reflection surface A6 is a circular reflection surface; the rear transmission surface A8 is a circular transmission surface; and light is refracted and incident from the front transmission surface A1, reflected by the reflection surface A3 to the front reflection surface A6, reflected by the front reflection surface A6, and then refracted and emergent from the rear transmission surface A8, and the emergent light is converged on the 4K sensor SE through the subsequent lens group.

Further, parameters of each surface along an optical path are as follows:

| Surface number | Radius of curvature | Center thickness | Refractive index | Abbe number | Effective semi-diameter |
|---|---|---|---|---|---|
| A1 | 47-49 | 22.50 | 1.70-1.75 | 50-51 | 37-38 |
| A2 | 160-163 | 15.00 | 1.75-1.80 | 51-52 | 37-38 |
| A3 | −22-−21 | −15.00 | 1.00 | 0 | 15-16 |

-continued

| Surface number | Radius of curvature | Center thickness | Refractive index | Abbe number | Effective semi-diameter |
|---|---|---|---|---|---|
| A4 | 160-163 | −22.50 | 1.70-1.75 | 50-51 | 12-13 |
| A5 | 47-49 | 0.81 | 1.70-1.75 | 50-51 | 7-8 |
| A6 | −126--125 | 21.50 | 1.00 | 0 | 7-8 |
| A7 | 160-163 | 15.00 | 1.75-1.80 | 51-52 | 4-5 |
| A8 | −22--21 | 3.00 | | | 3-4 |
| B1 | −14--13 | 2.10 | 1.80-1.90 | 39-40 | 4-5 |
| B2 | 19-20 | 4.88 | 1.65-1.70 | 55-56 | 5-6 |
| B3 | −17--16 | 2.10 | | | 6-7 |
| C1 | 19-20 | 4.80 | 1.60-1.70 | 42-43 | 7.70 |
| C2 | 43-44 | 5.00 | | | 7-8 |
| D1 | 543-544 | 2.50 | 1.80-1.90 | 42-43 | 8-9 |
| D2 | 19-20 | 2.10 | | | 8-9 |
| E1 | 22-23 | 7.90 | 1.50-1.60 | 68-69 | 10-11 |
| E2 | −34--33 | 2.10 | | | 10-11 |
| F1 | 31-32 | 10.70 | 1.50-1.60 | 68-69 | 10-11 |
| F2 | −13--12 | 4.10 | 1.70-1.80 | 47-48 | 9-10 |
| F3 | −144--143 | 17.00 | | | 9-10 |
| G1 | Infinite | 0.80 | 1.50-1.60 | 64-65 | 7-8 |
| G2 | Infinite | — | | | 7-8 |

A1 and A5 are the same surface, and A2, A4, and A7 are the same surface.

Beneficial effects of the present disclosure are as follows:

A field of view of the panoramic annular optical system of the present disclosure can reach) (30°~100°)×360°, a visible light resolution reaches 24.3 million pixels, the image quality is good, and images are displayed with high resolution, fully meeting the requirements of 4K high definition.

DETAILED DESCRIPTION

The following clearly and completely describes the technical solutions in the embodiments of the present disclosure with reference to accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
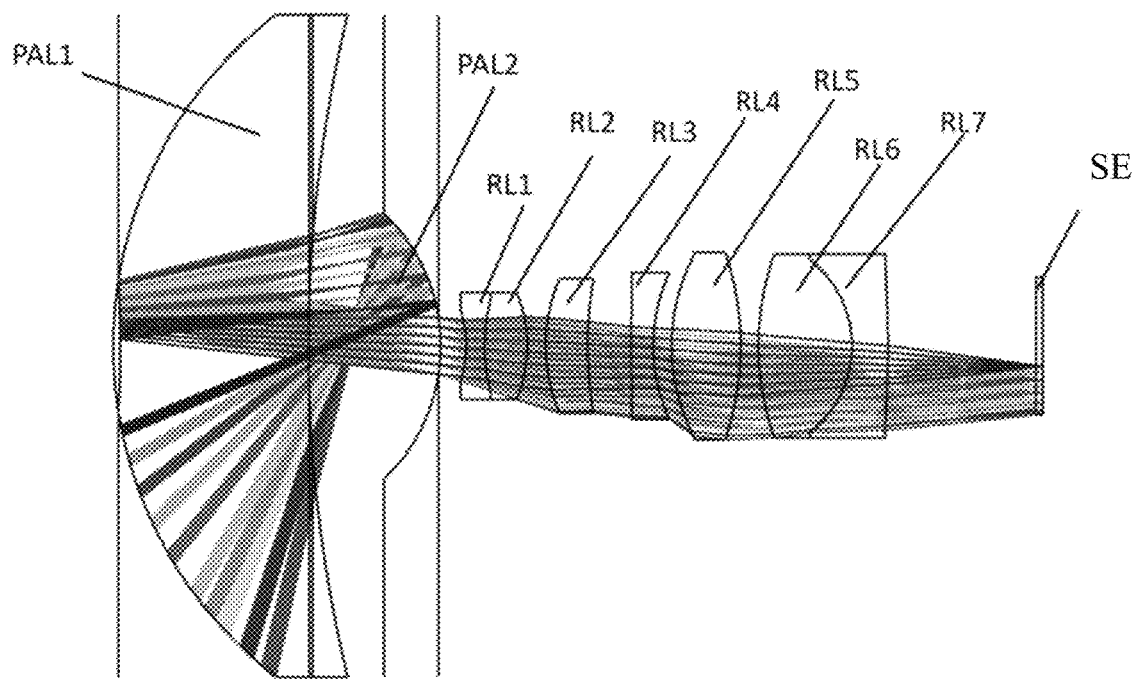
FIG. 1 is an optical structure diagram of a 4K high-resolution panoramic annular optical system according to the present disclosure.

FIG. 1 is an optical structure diagram of a 4K high-resolution panoramic annular optical system of the present disclosure, which includes a panoramic annular lens head unit, a subsequent lens group, and a 4K sensor SE that are coaxially installed, where the panoramic annular lens head unit includes a first lens PAL1 and a second lens PAL2; the subsequent lens group includes a third lens RL1, a fourth lens RL2, a fifth lens RL3, a sixth lens RL4, a seventh lens RL5, an eighth lens RL6, and a ninth lens RL7 that are arranged in order from an object plane to an image plane; the first lens PAL1 and the fifth lens RL3 are meniscus glass lenses with positive refractive power; the six lens RL4 and the ninth lens RL7 are meniscus glass lenses with negative refractive power; the second lens PAL2, the fourth lens RL2, the seventh lens RL5, and the eighth lens RL6 are biconvex lenses with positive refractive power; the third lens RL1 is a biconcave lens with negative refractive power; convex surfaces of the first lens PAL1, the fifth lens RL3, and the sixth lens RL4 are all facing towards the object plane, and concave surfaces of the first lens PAL1, the fifth lens RL3, and the sixth lens RL4 are all facing towards the image plane; a concave surface of the ninth lens RL7 is facing towards the object plane, and a convex surface of the ninth lens RL7 are facing towards the image plane.

Figure 2:
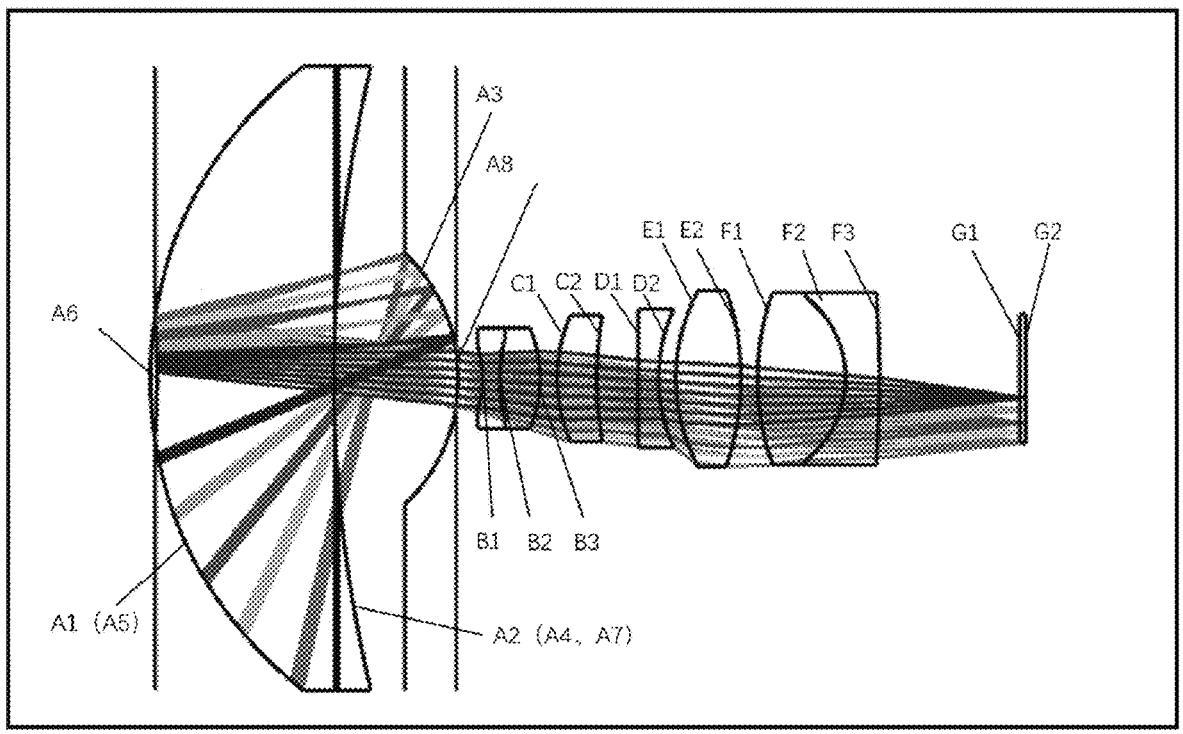
FIG. 2 is a diagram marking each surface along an optical path in a 4K high-resolution panoramic annular optical system according to the present disclosure.

FIG. 2 is a diagram marking each surface along an optical path in a 4K high-resolution panoramic annular optical system of the present disclosure. The first lens PAL1 and the second lens PAL2 are glued together to form a first integral unit; an integral front surface of the first integral unit includes a front transmission surface A1 and a front reflection surface A6 located in the center of the front transmission surface, an integral rear surface of the first integral unit includes a rear reflection surface A3 and a rear transmission surface A8 located in the center of the rear reflection surface, and a glued surface of the first integral unit is a transmission surface A2; the third lens RL1 and the fourth lens RL2 are glued together to form a second integral unit; a front surface of the second integral unit is a transmission surface B1, a rear surface of the second integral unit is a transmission surface B3, and an in-between glued surface of the second integral unit is a transmission surface B2; the fifth lens RL3 is a single lens, a front surface of the fifth lens RL3 is a transmission surface C1, and a rear surface of the fifth lens RL3 is a transmission surface C2; the sixth lens RL4 is a single lens, a front surface of the sixth lens RL4 is a transmission surface D1, and a rear surface of the sixth lens RL4 is a transmission surface D2; the seventh lens RL5 is a single lens, a front surface of the seventh lens RL5 is a transmission surface E1, and a rear surface of the seventh lens RL5 is a transmission surface E2; the eighth lens RL6 and the ninth lens RL7 are glued together to form a third integral unit; a front surface of the third integral unit is a transmission surface F1, a rear surface of the third integral unit is a transmission surface F3, and an in-between glued surface of the third integral unit is a transmission surface F2; a front part of the 4K sensor SE is a protective glass, a front surface of the 4K sensor SE is a light receiving surface G1, and a rear surface of the 4K sensor SE is an image surface G2; the front transmission surface A1 is an annular transmission surface; the reflection surface A3 is an annular reflection surface; the front reflection surface A6 is a circular reflection surface; the rear transmission surface A8 is a circular transmission surface. Light is refracted and incident from the front transmission surface A1, reflected by the reflection surface A3 to the front reflection surface A6, reflected by the front reflection surface A6, and then refracted and emergent from the rear transmission surface A8, and the emergent light is converged on the 4K sensor SE through the subsequent lens group.

When used, an imaging system is placed with the optical axis perpendicular to the ground. A panoramic annular imaging unit projects the light emitted by an object within 360° around the optical axis and within 30° to 100° of the horizontal line onto an imaging surface of a sensor. The imaging surface is annular, with a circular blind zone in the center.

FIG. 3 to FIG. 8 are optical performance charts applied in embodiments of the present disclosure. Five fields of view, including 30°, 50°, 70°, 85°, and 100°, are used.

Figure 3:
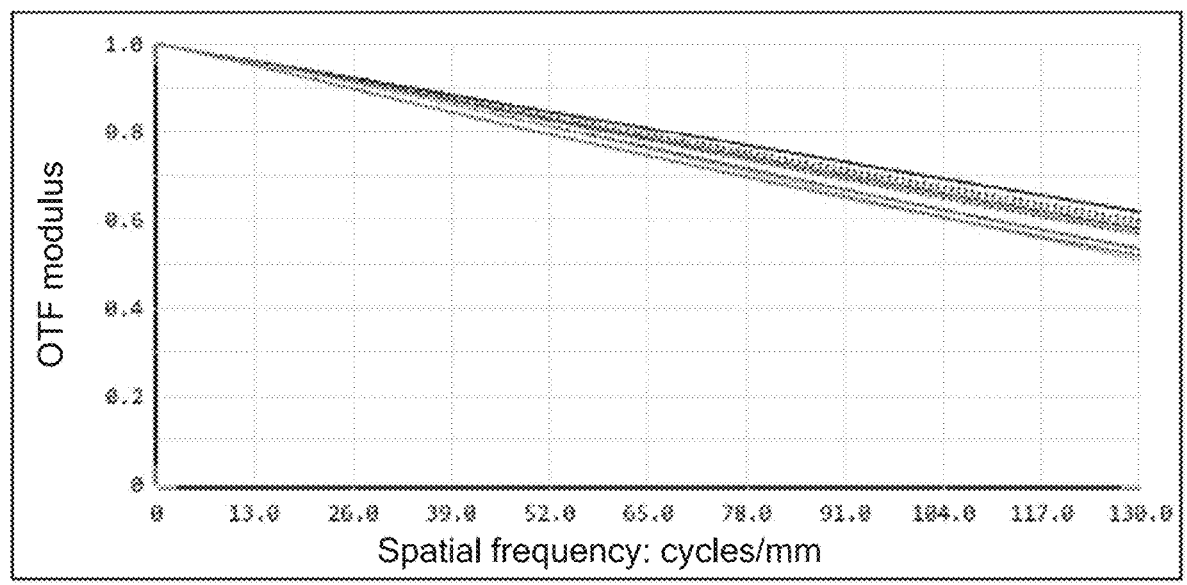
FIG. 3 is an MTF chart for visible light having a wavelength of 486 nm to 656 nm according to the present disclosure.

FIG. 3 is an MTF chart for visible light having a wavelength of 486 nm to 656 nm according to the present disclosure. The MTF chart represents a comprehensive resolution level of an optical system. As seen from FIG. 3, an MTF value of the full field of view at 130 lp/mm is greater than or equal to 0.5, which is close to a diffraction limit, so clearing image is achieved, meeting the requirements of 4K. In addition, the MTF performance of the optical system at various wavelengths is also good.

Figure 4:
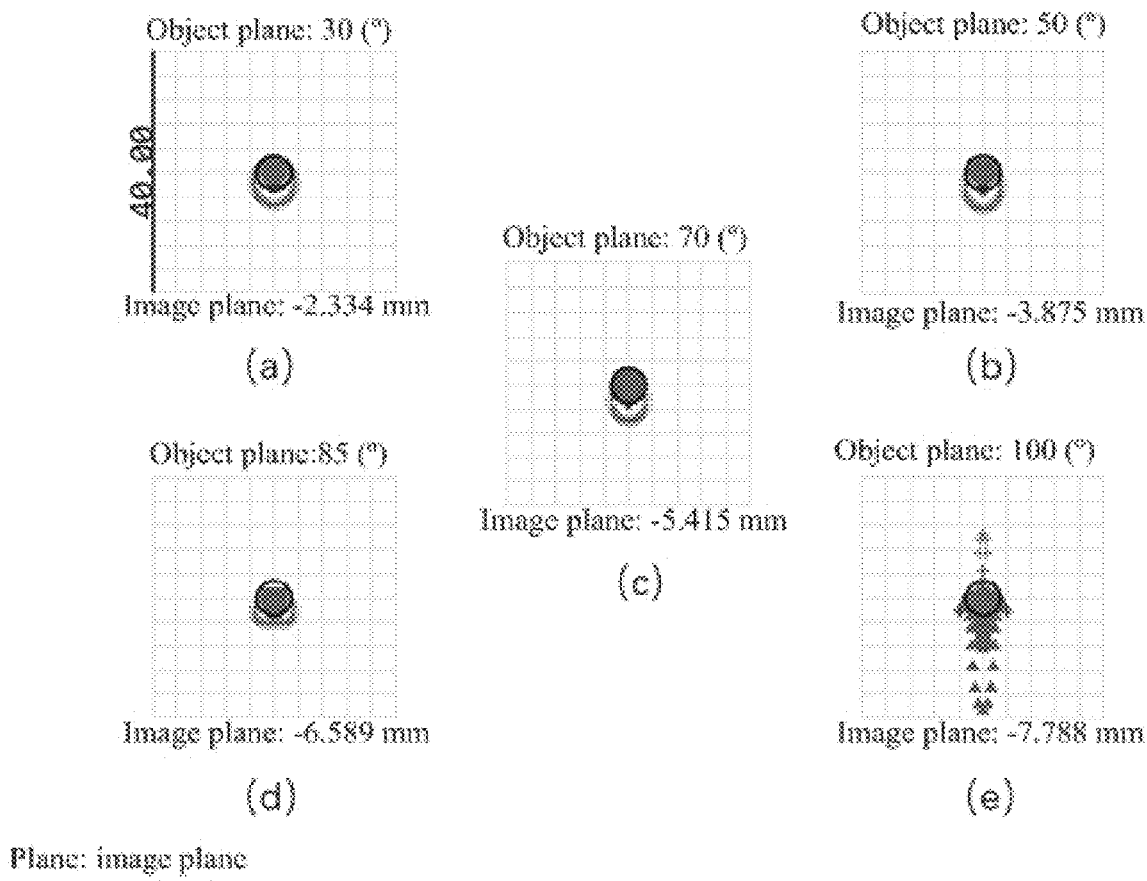
FIG. 4 is a standard spot diagram for visible light having a wavelength of 486 nm to 656 nm according to the present disclosure.

FIG. 4 is a spot diagram of visible light having a wavelength of 486 nm to 656 nm according to the present disclosure. Three wavelengths, F (486 nm), d (588 nm), and C (656 nm), are used, with a weight ratio of 1:1:1. Five fields of view are used to analyze an RMS radius value of the light emitted by an object to an image plane. The light emitted by the object forms a diffuse spot on the image plane after passing through the actual optical system. Parts (a), (b), (c), (d), and (e) in FIG. 4 show diffuse spots at different locations on the image plane corresponding to the fields of view of 30°, 50°, 70°, 85°, and 100°. A longitudinal dimension in each part is 40.00. The longitudinal dimension corresponds to a zoom factor, a superscript corresponds to a field of view, and a subscript corresponds to a position of the light from different fields of view to the image plane. The RMS radius values corresponding to the five fields of view are 1.319 μm, 1.317 μm, 1.479 μm, 1.505 μm, and 3.132 μm, all of which are less than a single pixel size of 3.9 μm, so clear imaging can be achieved.

Figure 5:
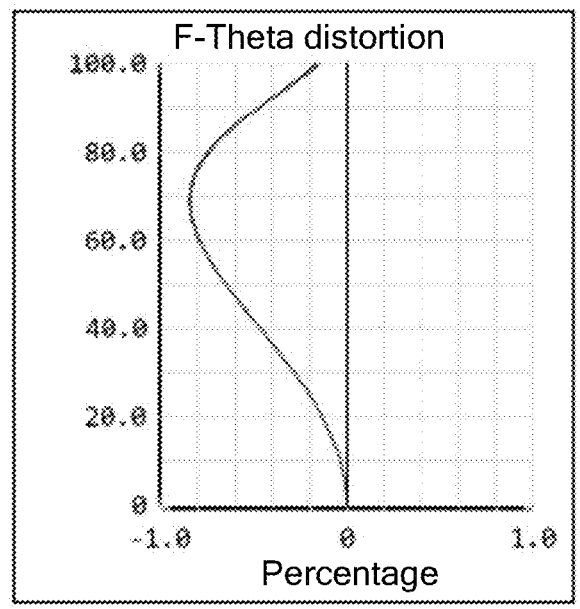
FIG. 5 is a field curvature and distortion diagram for visible light having a wavelength of 486 nm to 656 nm according to the present disclosure.
Figure 6A:
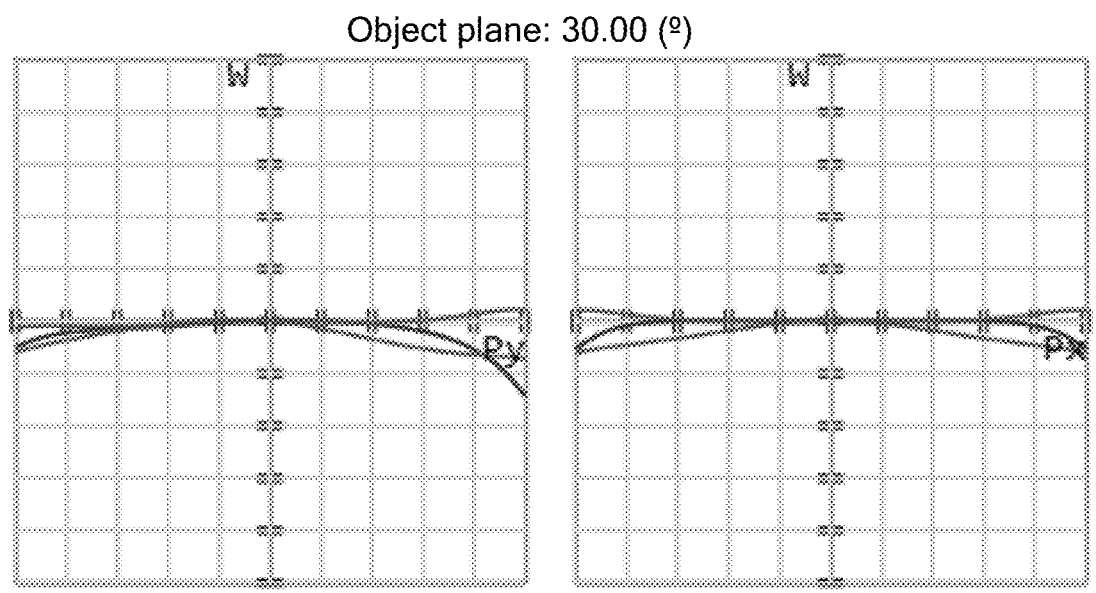
FIG. 6 is an optical path difference diagram for visible light having a wavelength of 486 nm to 656 nm according to the present disclosure.
Figure 6B:
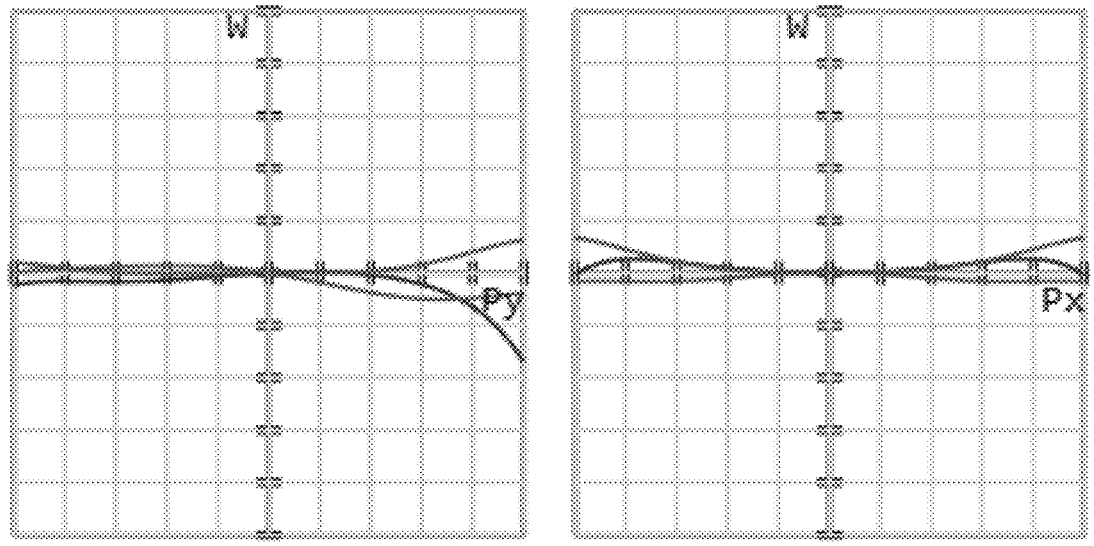
Figure 6C:
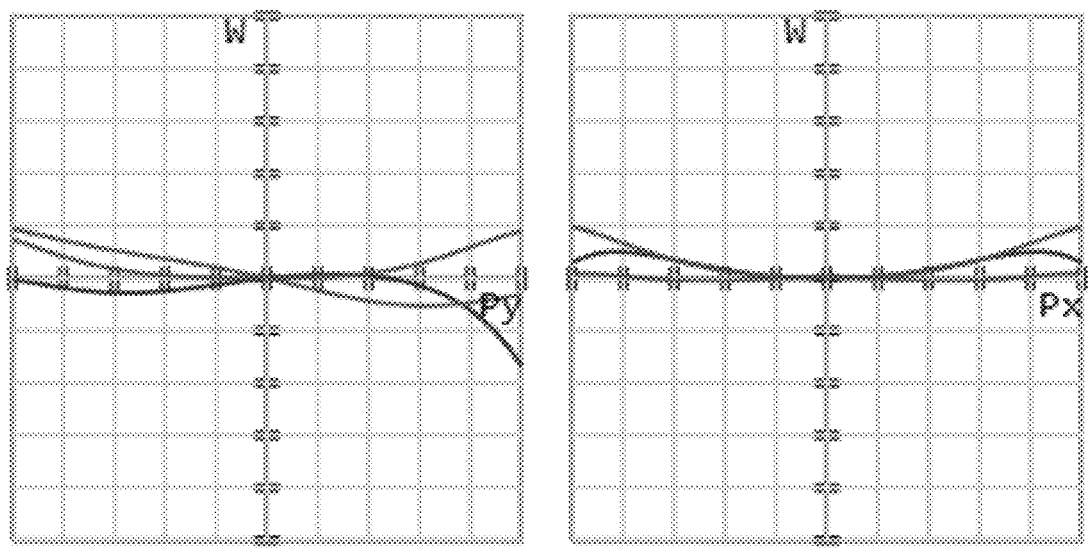
Figure 6D:
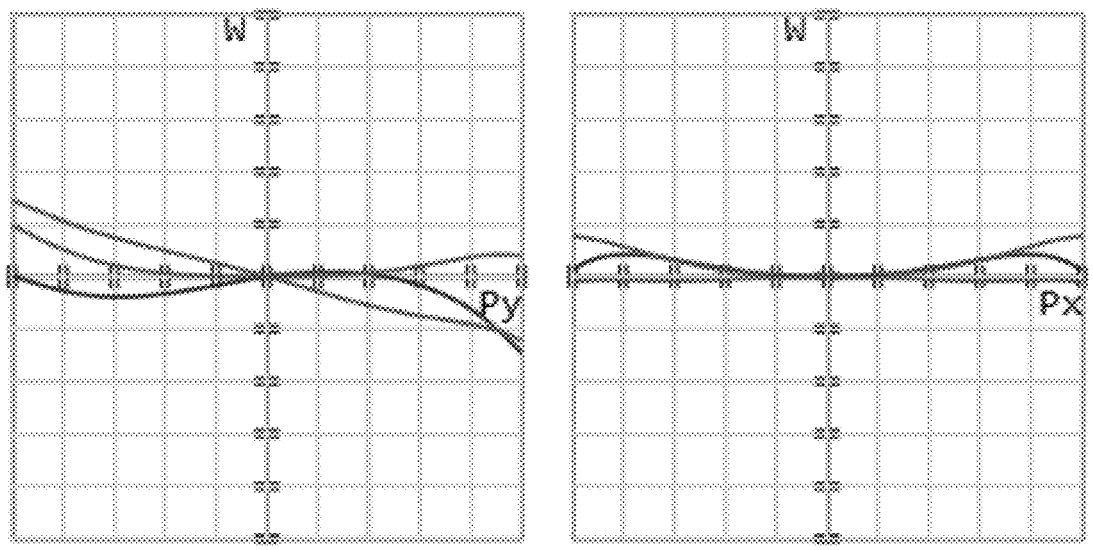
Figure 6E:
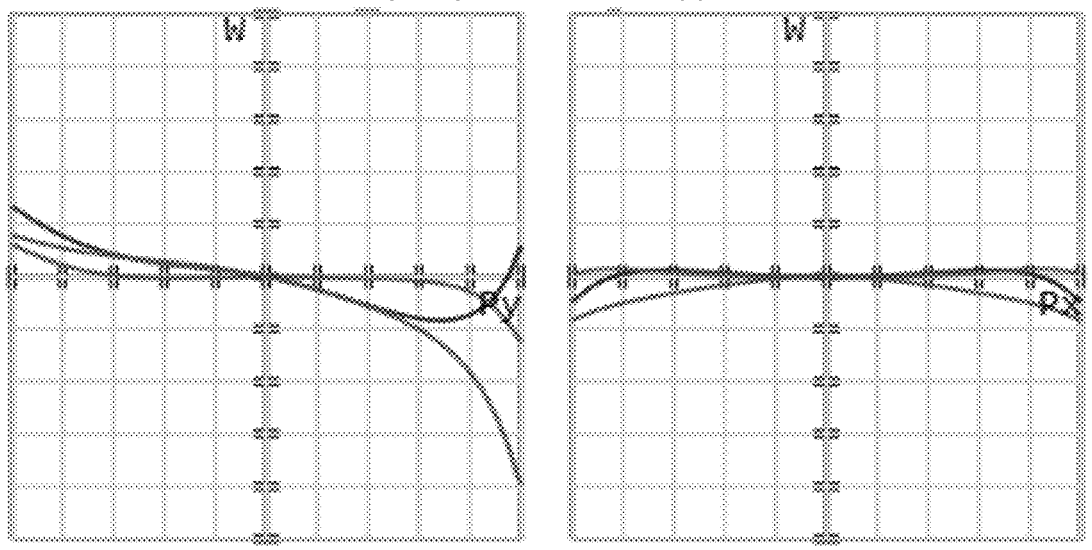

FIG. 5 is a field curvature and distortion diagram for visible light having a wavelength of 486 nm to 656 nm according to the present disclosure. A distortion curve represents F-Theta distortion values under different fields of view, where the unit is %. As seen from FIG. 5, an absolute value of F-Theta distortion is less than or equal to 1%.

FIG. 6 is an optical path difference diagram for visible light having a wavelength of 486 nm to 656 nm according to the present disclosure. The optical path difference diagram is also called a wave aberration diagram. Parts (a), (b), (c), (d), and (e) in FIG. 6 respectively represent optical path differences between an ideal spherical wave and an actual wave surface after the object point light from five fields of view of 30°, 50°, 70°, 85°, and 100° passes through the optical system. Each part includes optical path difference images in the meridian and sagittal directions. For example, in part (a) of FIG. 6, the left figure is an optical path difference image in the meridian direction, and the right figure is an optical path difference image in the sagittal direction, where x-ordinates Px and Py represent normalized pupil coordinates, and y-ordinate W represents an optical path difference value. FIG. 6 shows an imaging wavefront aberration. As seen from FIG. 6, an optical path difference in each field of view is less than or equal to ±1 waves.

Figure 7:
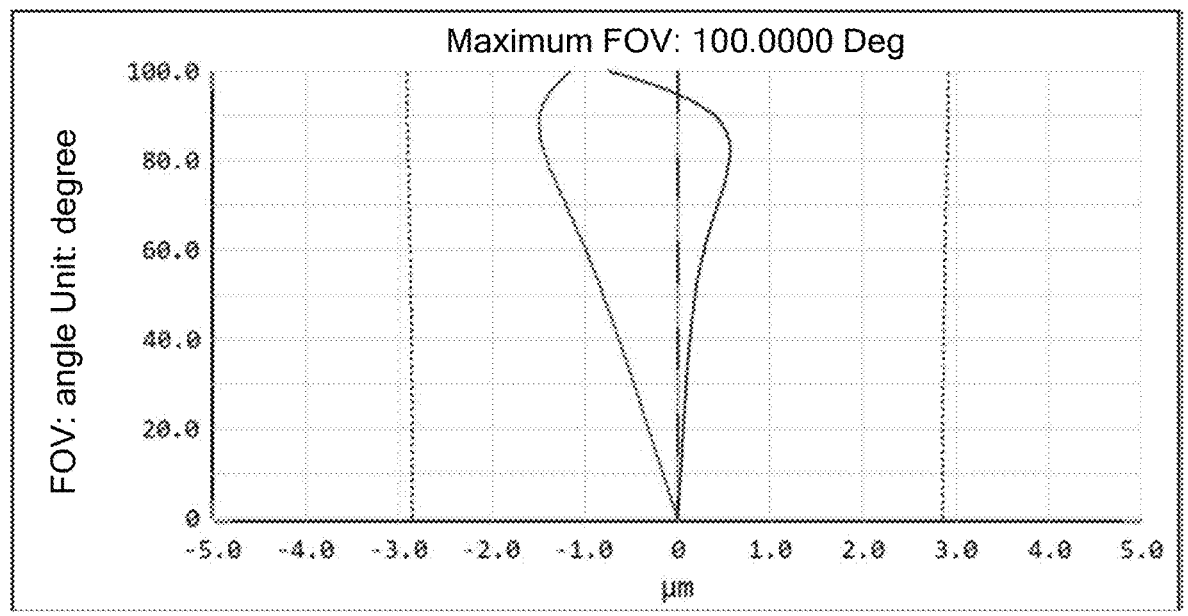
FIG. 7 is a lateral chromatic aberration diagram for visible light having a wavelength of 486 nm to 656 nm according to the present disclosure.

FIG. 7 is a lateral chromatic aberration diagram for visible light having a wavelength of 486 nm to 656 nm according to the present disclosure. As seen from FIG. 7, a lateral chromatic aberration curve of each wavelength is within the Airy disk, indicating that the chromatic aberration is well corrected.

Figure 8:
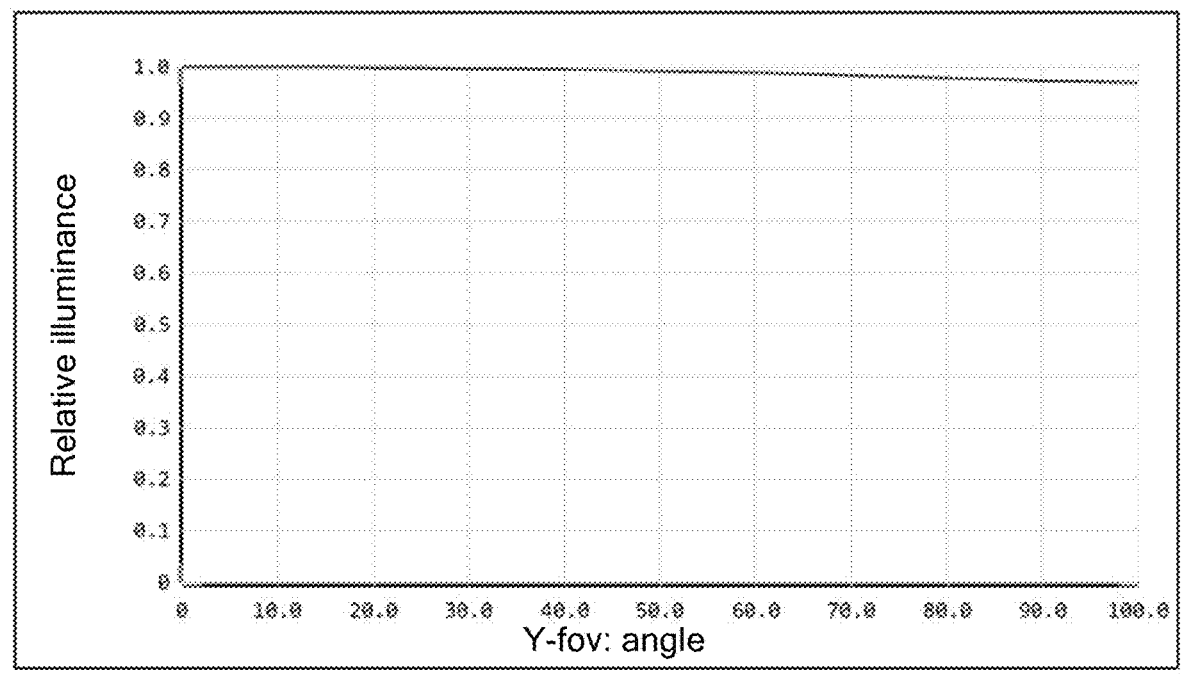
FIG. 8 is a relative illuminance diagram for visible light having a wavelength of 486 nm to 656 nm according to the present disclosure.

FIG. 8 is a relative illuminance diagram for visible light having a wavelength of 486 nm to 656 nm according to the present disclosure. As seen from FIG. 8, the curve descends smoothly, a relative illuminance value under a maximum field of view is greater than 0.9, and an image is bright with uniform illuminance.

In the embodiments of the present disclosure, an effective focal length of the optical system is EFL, an F-number is FNO, a field of view is FOV, and a total track length of the optical system is TTL.

Table 1 shows the preferred parameter values of the present disclosure.

EFL=−4.47 mm, FNO=3.98, FOV=(30°~100°)×360°, image size: 23.4 mm×15.6 mm, TTL=106 mm, and a photosensitive imaging chip is SONY's Exmor APS HD CMOS.

TABLE 1

| Surface number | Radius of curvature/ mm | Center thickness/ mm | Refractive index | Abbe number | Effective semi-diameter/mm |
| --- | --- | --- | --- | --- | --- |
| A1 | 47-49 | 22.50 | 1.70-1.75 | 50-51 | 37-38 |
| A2 | 160-163 | 15.00 | 1.75-1.80 | 51-52 | 37-38 |
| A3 | −22--21 | −15.00 | 1.00 | 0 | 15-16 |
| A4 | 160-163 | −22.50 | 1.70-1.75 | 50-51 | 12-13 |
| A5 | 47-49 | 0.81 | 1.70-1.75 | 50-51 | 7-8 |
| A6 | −126--125 | 21.50 | 1.00 | 0 | 7-8 |
| A7 | 160-163 | 15.00 | 1.75-1.80 | 51-52 | 4-5 |
| A8 | −22--21 | 3.00 | | | 3-4 |
| B1 | −14--13 | 2.10 | 1.80-1.90 | 39-40 | 4-5 |
| B2 | 19-20 | 4.88 | 1.65-1.70 | 55-56 | 5-6 |
| B3 | −17--16 | 2.10 | | | 6-7 |
| C1 | 19-20 | 4.80 | 1.60-1.70 | 42-43 | 7.70 |
| C2 | 43-44 | 5.00 | | | 7-8 |
| D1 | 543-544 | 2.50 | 1.80-1.90 | 42-43 | 8-9 |
| D2 | 19-20 | 2.10 | | | 8-9 |
| E1 | 22-23 | 7.90 | 1.50-1.60 | 68-69 | 10-11 |
| E2 | −34--33 | 2.10 | | | 10-11 |
| F1 | 31-32 | 10.70 | 1.50-1.60 | 68-69 | 10-11 |
| F2 | −13--12 | 4.10 | 1.70-1.80 | 47-48 | 9-10 |
| F3 | −144--143 | 17.00 | | | 9-10 |
| G1 | Infinite | 0.80 | 1.50-1.60 | 64-65 | 7-8 |
| G2 | Infinite | — | | | 7-8 |

A1 and A5 are surfaces at the same location, with the same radius of curvature, but differ in the effective semi-diameter. A2, A4 and A7 are surfaces at the same location, with the radius of curvature, but differ in the effective semi-diameter. The surfaces in Table 1 are sorted in the order of ray tracing.

Several embodiments are used for illustration of the principles and implementation methods of the present disclosure. The description of the embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A 4K high-resolution panoramic annular optical system, comprising:
   a panoramic annular lens head unit, a subsequent lens group, and a 4K sensor (SE) that is coaxially installed, wherein:

the panoramic annular lens head unit comprises a first lens (PAL1) and a second lens (PAL2);

the subsequent lens group comprises a third lens (RL1), a fourth lens (RL2), a fifth lens (RL3), a sixth lens (RL4), a seventh lens (RL5), an eighth lens (RL6), and a ninth lens (RL7) that are arranged in order from an object plane to an image plane;

the first lens (PAL1) and the fifth lens (RL3) are meniscus glass lenses with positive refractive power;

the six lens (RL4) and the ninth lens (RL7) are meniscus glass lenses with negative refractive power;

the second lens (PAL2), the fourth lens (RL2), the seventh lens (RL5), and the eighth lens (RL6) are biconvex lenses with positive refractive power;

the third lens (RL1) is a biconcave lens with negative refractive power;

convex surfaces of the first lens (PAL1), the fifth lens (RL3), and the sixth lens (RL4) are all facing towards the object plane, and concave surfaces of the first lens (PAL1), the fifth lens (RL3), and the sixth lens (RL4) are all facing towards the image plane; a concave surface of the ninth lens (RL7) is facing towards the object plane, and a convex surface of the ninth lens (RL7) is facing towards the image plane;

the first lens (PAL1) and the second lens (PAL2) are glued together to form a first integral unit;

an integral front surface of the first integral unit comprises:
  a front transmission surface (A1) and a front reflection surface (A6) located in a center of the front transmission surface, the front transmission surface (A1) is an annular transmission surface and the front reflection surface (A6) is a circular reflection surface;
  an integral rear surface of the first integral unit includes a rear reflection surface (A3) and a rear transmission surface (A8) located in a center of the rear reflection surface, the rear reflection surface (A3) is an annular reflection surface and the rear transmission surface (A8) is a circular transmission surface; and
  a glued surface of the first integral unit is a transmission surface (A2);

the third lens (RL1) and the fourth lens (RL2) are glued together to form a second integral unit;

a front surface of the second integral unit is a transmission surface (B1), a rear surface of the second integral unit is a transmission surface (B3), and an in-between glued surface of the second integral unit is a transmission surface (B2);

the fifth lens (RL3) is a single lens, a front surface of the fifth lens (RL3) is a transmission surface (C1), and a rear surface of the fifth lens (RL3) is a transmission surface (C2);

the sixth lens (RL4) is a single lens, a front surface of the sixth lens (RL4) is a transmission surface (D1), and a rear surface of the sixth lens (RL4) is a transmission surface (D2);

the seventh lens (RL5) is a single lens, a front surface of the seventh lens (RL5) is a transmission surface (E1), and a rear surface of the seventh lens (RL5) is a transmission surface (E2);

the eighth lens (RL6) and the ninth lens (RL7) are glued together to form a third integral unit; a front surface of the third integral unit is a transmission surface (F1), a rear surface of the third integral unit is a transmission surface (F3), and an in-between glued surface of the third integral unit is a transmission surface (F2); and a front part of the 4K sensor (SE) is a protective glass, a front surface of the 4K sensor (SE) is a light receiving surface (G1), and a rear surface of the 4K sensor (SE) is an image surface (G2);

wherein light is refracted and incident from the front transmission surface (A1), reflected by the rear reflection surface (A3) to the front reflection surface (A6), reflected by the front reflection surface (A6), and then refracted and emergent from the rear transmission surface (A8), and the emergent light is converged on the 4K sensor (SE) through the subsequent lens group.

2. The 4K high-resolution panoramic annular optical system according to claim 1, wherein parameters of each surface along an optical path comprises:

| Surface number | Radius of curvature | Center thickness | Refractive index | Abbe number | Effective semi-diameter |
|---|---|---|---|---|---|
| A1 | 47-49 | 22.50 | 1.70-1.75 | 50-51 | 37-38 |
| A2 | 160-163 | 15.00 | 1.75-1.80 | 51-52 | 37-38 |
| A3 | −22−−21 | −15.00 | 1.00 | 0 | 15-16 |
| transmission surface (A4) | 160-163 | −22.50 | 1.70-1.75 | 50-51 | 12-13 |
| front transmission surface (A5) | 47-49 | 0.81 | 1.70-1.75 | 50-51 | 7-8 |
| A6 | −126−−125 | 21.50 | 1.00 | 0 | 7-8 |
| transmission surface (A7) | 160-163 | 15.00 | 1.75-1.80 | 51-52 | 4-5 |
| A8 | −22−−21 | 3.00 | | | 3-4 |
| B1 | −14−−13 | 2.10 | 1.80-1.90 | 39-40 | 4-5 |
| B2 | 19-20 | 4.88 | 1.65-1.70 | 55-56 | 5-6 |
| B3 | −17−−16 | 2.10 | | | 6-7 |
| C1 | 19-20 | 4.80 | 1.60-1.70 | 42-43 | 7.70 |
| C2 | 43-44 | 5.00 | | | 7-8 |
| D1 | 543-544 | 2.50 | 1.80-1.90 | 42-43 | 8-9 |
| D2 | 19-20 | 2.10 | | | 8-9 |
| E1 | 22-23 | 7.90 | 1.50-1.60 | 68-69 | 10-11 |
| E2 | −34−−33 | 2.10 | | | 10-11 |
| F1 | 31-32 | 10.70 | 1.50-1.60 | 68-69 | 10-11 |
| F2 | −13−−12 | 4.10 | 1.70-1.80 | 47-48 | 9-10 |
| F3 | −144−−143 | 17.00 | | | 9-10 |
| G1 | Infinite | 0.80 | 1.50-1.60 | 64-65 | 7-8 |
| G2 | Infinite | — | | | 7-8 | wherein A1 and the front transmission surface (A5) are surfaces at the same location, and A2, the transmission surface (A4), and the transmission surface (A7) are surfaces at the same location.

* * * * *